United States Patent [19]
Ziemba

[11] 4,085,680
[45] Apr. 25, 1978

[54] FUZE ENCODER

[75] Inventor: Richard Thomas Ziemba, Burlington, Vt.

[73] Assignee: General Electric Company, Burlington, Vt.

[21] Appl. No.: 769,649

[22] Filed: Feb. 17, 1977

[51] Int. Cl.² .................... F42C 11/04; G06K 7/10
[52] U.S. Cl. ........................ 102/70.2 R; 235/456
[58] Field of Search ............... 102/70.2 R, 70.2 G, 102/70.2 GA; 235/61.11 R, 61.11 E

[56] References Cited

U.S. PATENT DOCUMENTS

| | | | |
|---|---|---|---|
| 3,714,898 | 2/1973 | Ziemba | 102/70.2 R |
| 3,786,238 | 1/1974 | Heisner | 235/61.11 E |
| 3,844,217 | 10/1974 | Ziemba | 102/70.2 R |
| 3,849,660 | 11/1974 | Hommerin | 235/61.11 E |
| 3,981,245 | 9/1976 | Buzzell et al. | 102/70.2 GA |
| 4,036,142 | 7/1977 | Williams | 102/70.2 R |

Primary Examiner—Charles T. Jordan
Attorney, Agent, or Firm—Bailin L. Kuch

[57] ABSTRACT

A photo-electric tape reader particularly adapted to ordnance use wherein power is provided by a setback generator, and which reader is free of the malfunctions caused by contact bounce and corroded surfaces of resilient metal contacts. The reader utilizes a light emitting diode in the charging circuit of the setback generator which serves as a light source to a reader matrix of photo diodes.

8 Claims, 5 Drawing Figures

FUZE ENCODER

BACKGROUND OF THE INVENTION

1. Field of Art

This invention relates to a mechanical to electrical encoder, and more particularly, to a system for generating a coded electrical output signal uniquely responsive to the displacement of a tape. This invention is particularly adapted for use in an electronic fuze for ordnance.

2. Prior Art

Mechanical to electrical encoders broadly are well known, and an early example thereof is a punched tape reader such as is used in a telegraph system. Such encoders are also known for use in electronic fuzes for ordnance. For example, a system having a tape with visible arabic numbers on one side, and code-combination electrical conductors on the other side which are read by a bank of electrical contacts, is shown in my patent U.S. Pat. No. 3,844,217 filed Sept. 28, 1972. Various encoders are shown in Technical Report 4624, "Beehive Electronic Time Fuze" by Picatinny Arsenal, Dover, New Jersey, April 1974, such as an odometer encoder, a disc encoder, and a tape encoder. Each such mechanical encoder suffers from possible misfunction due to contact bounce, and corroded contact surfaces.

SUMMARY OF THE INVENTION

An object of this invention is to provide a photo-electric tape reader particularly adapted to ordnance use wherein power is provided by a setback generator, and which reader is free of the malfunctions caused by contact bounce and corroded surfaces of resilient metal contacts. The reader utilizes a light emitting diode in the charging circuit of the setback generator which serves as a light source to a reader matrix of photo diodes.

BRIEF DESCRIPTION OF THE DRAWING

These and other objects, features and advantages of the invention will be apparent from the following specification thereof taken in conjunction with the accompanying drawing in which.

DESCRIPTION OF THE INVENTION

Figure 1:
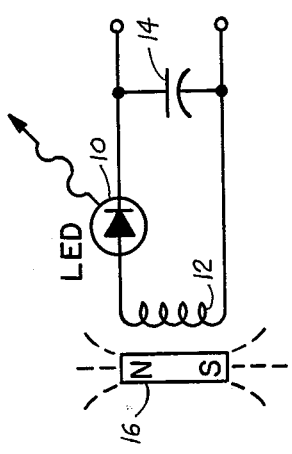
FIG. 1 is a simplified schematic of a setback generator which is conventional except that in accordance with my invention it utilizes a light emitting diode as the unidirectional element between the pickup coil and the storage capacitor.

A simplified schematic of a setback generator is shown in FIG. 1. Setback generators are shown in my patent with G. E. Buzzell, U.S. Pat. No. 3,981,245 issued Sept. 21, 1976; U.S. Pat. No. 3,120,187 issued to G. Wyser on Feb. 4, 1964; and Picatinny Technical Report 4624, supra. FIG. 1 is conventional except for the use of a light emitting diode 10, instead of a conventional diode, in series with the generator pick up coil 12 and the storage capacitor 14. A change in the magnetic field, caused by movement of the magnetic structure 16 on setback of the projectile, induces a current through the coil 12 which is conducted through the diode 10 to charge the capacitor 14 to a predetermined voltage level. The diode prevents reverse discharge of the capacitor. The capacitor serves as a source of power for the electronic systems of the fuze. An example of such a system is shown in my patent, U.S. Pat. No. 3,714,898 issue Feb. 6, 1973.

Figure 2:
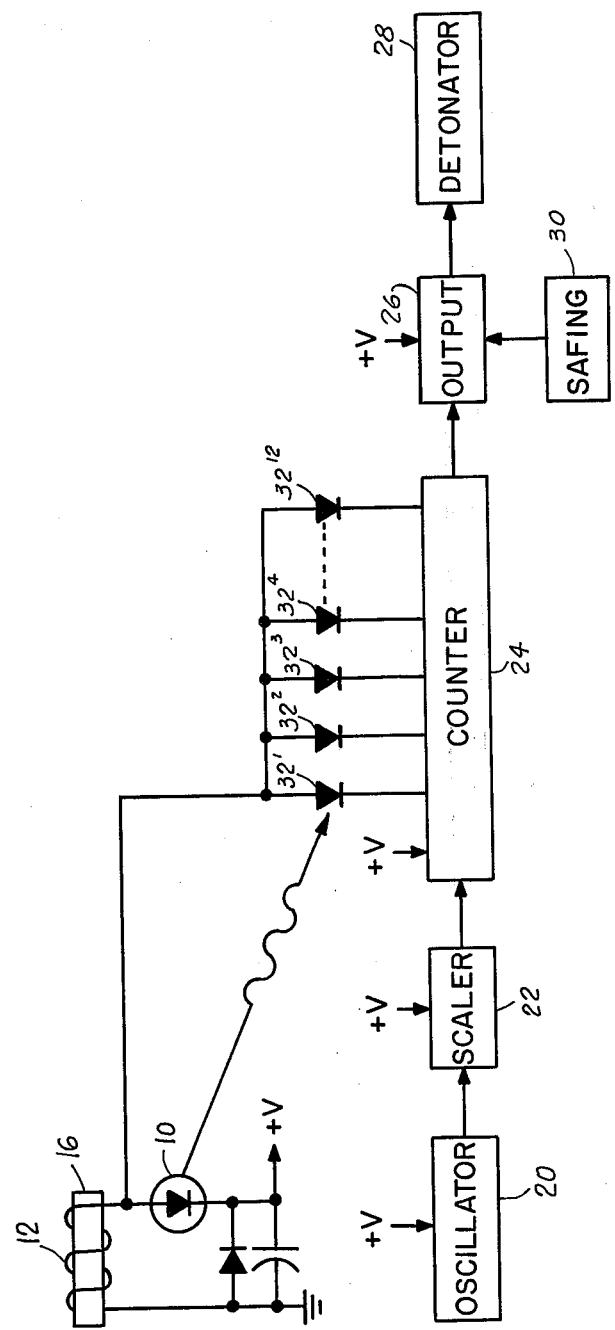
FIG. 2 is a simplified schematic of a tape reader in a fuze embodying this invention.

A simplified schematic of a variable range fuze embodying this invention is shown in FIG. 2. This fuze may be of the type shown in a more complex form in my patent U.S. Pat. No. 3,844,217 issued Oct. 24, 1974. The fuze includes a local oscillator circuit 20 which pulses a scaler circuit 22, which in turn pulses a counter circuit 24, which on receiving a full count of pulses proides an output pulse through an output circuit 26 to a detonator circuit 28. A safing and arming mechanism 30 may control access of the output pulse to the detonator circuit. The counter circuit 24 may be preset to a count greater than zero, to predetermine the specific number of pulses from the scaler circuit 22 required to fill the counter circuit 24 to generate an output pulse. This preset count will predetermine the range at which the detonator 28 is ignited.

The counter has a plurality of binary stages, for example, twelve, each of which is respectively coupled to the output terminal of a photo diode $32^1 \ldots 32^{12}$, whose input terminal is respectively coupled to the input terminal of the light emitting diode 10. Thus setback of generator provides a pulse of current through the light emitting diode 20 and concurrently also provides a pulse of current to each of the photo diodes or light sensitive switching means $32^1 \ldots 32^{12}$. Light is conducted from the light emitting diode to certain of the photo diodes. The illuminated photo diodes will conduct a respective pulse to their respective stages of the counter. The not illuminated photo diodes will not conduct a pulse. By this arrangement certain of the stages may be pulsed to their "set" condition, while the remainder of the stages remain in their "reset" condition, thereby setting the counter to a desired predetermined number.

Figure 3:
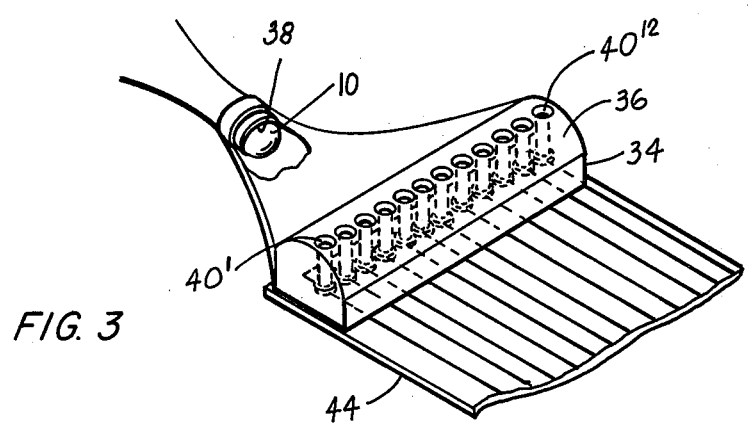
FIG. 3 is a perspective view of the reader embodying this invention.
Figure 4:
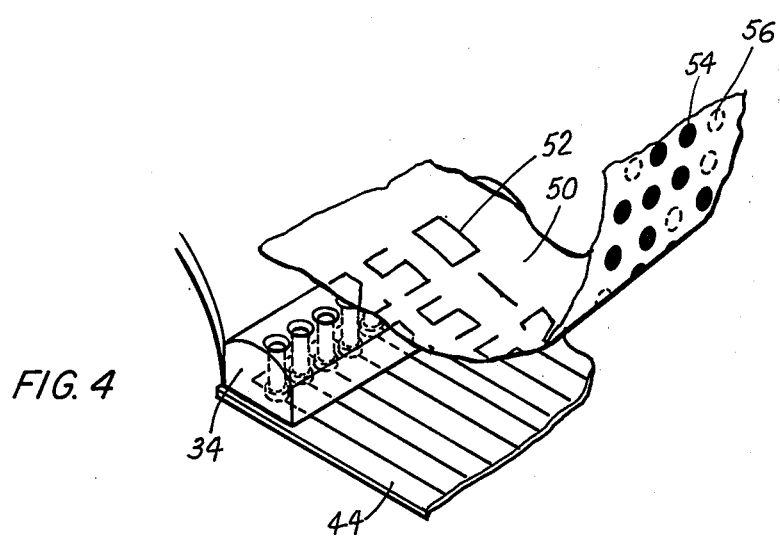
FIG. 4 is a detail of the reader of FIG. 3 showing the tape which is to be read.
Figure 5:
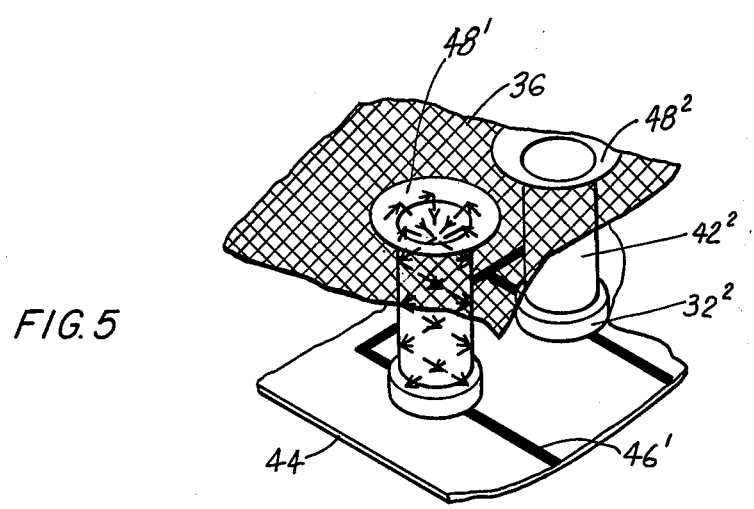
FIG. 5 is a detail of the showing of FIG. 4.

The mechanization of the tape reader is shown in FIGS. 3, 4 and 5. A tape reader block 34 is formed of a transparent material with its outer upper surface 36 and side surfaces plated with a highly reflective material. The light emitting diode 10 is mounted in a bore 38 in the block, so that, when conducting, the diode 10 will illuminate the interior of the block 34. A plurality of bores $40^1 \ldots 40^{12}$ equal in number to the number of photo diodes is provided in the block, extending from the upper surface 36 to the lower surface of the block. A respective photo diode $32^1 \ldots 32^{12}$ is disposed in the lower portion of each of these bores. A respective light pipe $42^1 \ldots 42^{12}$ is disposed in the upper portion of each of the bores. A printed circuit board or tape 44 is fixed to the lower surface of the block 34 and has a plurality of conductors $46^1 \ldots 46^{12}$, each of which has a gap adjacent a respective hoto diode which is bridged by that photo diode. I.e., each photo diode is in electrical contact with both ends of the conductor adjacent the gap ad is adapted to shunt across the gap. The uppermost portion of each bore 40 has a truncated conical enlargement 48 which includes a base circular area wherein the reflective material on the surface 36 of this block has been removed. Each light pipe $42^1 \ldots 42^{12}$ extends from the upper surface of the respective photo diode to the truncating surface of the bore enlargement. A setting tape 50 overlies and contacts the upper surface 36 of the block. The upper surface of the tape may have a column of visually sensible indicia thereon, such as rows of numbers 52 indicating progressively increasing range. The under surface of the tape is reflective and has a column of rows of optically sensible binary indicators thereon, in predetermined correlation with the upper surface column. Each row comprises a plurality of dot positions, each dot position being aligned with a respective bore 42. Each dot position may be occupied by a circular area of nonreflective material 54 or not so occupied, i.e., a black dot 54 or no dot 56. When the block 34 is illuminated by the light emitting diode 10, if there is a no-dot over a particular bore, light will be reflected by the no-dot area from the interior of the block, through the bore conical enlargement, into the upper end of the light and down into the upper surface of the photo diode, energizing the photo diode into conduction to act as a shunt across the respective conductor. A set pulse is thereby set into the respective stage of the counter. Conversely, when the block is illuminated, if there is a black dot over a particular bore, light will not be reflected to the respective photo diode, and the respective stage of the counter will remain in its reset condition.

What is claimed is:

1. A fuze for ordnance comprising:
a power supply including a source of radiation;
counter means;
means for presetting said counter means to a selectively variable count, including
radiation responsive switching means, and
means for selectively passing radiation from said source of radiation to said switching means.

2. A fuze according to claim 1 wherein:
said source of radiation is a light emitting diode, and said radiation responsive switching means includes a photo diode.

3. A fuze according to claim 2 wherein:
said power supply includes a setback generator and a storage capacitor in series circuit with said light switching diode.

4. A fuze according to claim 3 wherein:
said counter means comprises a plurality of binary stages;
said radiation responsive switching means comprises a like plurality of photo diodes each respectively coupled between an input of each binary stage and the unrectified output of said setback generator.

5. A fuze according to claim 4 wherein:
said means for selectively passing radiation includes a like plurality of light pipes each respectively coupled to one of said plurality of photo diodes, and
means for selectively reflecting light from said light emitting diode into respective ones of said plurality of light pipes.

6. A fuze according to claim 5 wherein:
said means for selectively reflecting light comprises a tape having a column of rows of code areas, each row having a like plurality of areas, one for each light pipe respectively, certain of said areas having a reflective characteristic.

7. A fuze according to claim 6 wherein:
said means for selectively reflecting light further comprises a light conductor coupling said light emitting diode to said tape.

8. A fuze according to claim 7 wherein:
said light pipes are disposed in said light conductor but optically decoupled therefrom except by said areas having a reflective characteristic.

* * * * *

UNITED STATES PATENT OFFICE
CERTIFICATE OF CORRECTION

Patent No. 4,085,680                    Dated April 25, 1978

Inventor(s) Richard Thomas Ziemba

It is certified that error appears in the above-identified patent and that said Letters Patent are hereby corrected as shown below:

Column 2, line 14 change "proides" to --provides--,
          line 58 change "hoto" to --photo--,
          line 61 change "ad" to --and--.
Column 3, line 16 after "light" insert -pipe--.
Column 4, line 12 change "sta ge" to --stage--.

Signed and Sealed this

*Twenty-seventh* Day of *February 1979*

[SEAL]

*Attest:*

RUTH C. MASON
*Attesting Officer*

DONALD W. BANNER
*Commissioner of Patents and Trademarks*